US008243413B2

(12) United States Patent
Harada et al.

(10) Patent No.: US 8,243,413 B2
(45) Date of Patent: Aug. 14, 2012

(54) POLYMER SURGE ARRESTER

(75) Inventors: Satoshi Harada, Kawasaki (JP); Katsuaki Komatsu, Yokohama (JP); Tomikazu Anjiki, Yokohama (JP); Jun Kobayashi, Yokohama (JP); Takamichi Tsukui, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 79 days.

(21) Appl. No.: 12/823,804

(22) Filed: Jun. 25, 2010

(65) Prior Publication Data

US 2010/0328834 A1 Dec. 30, 2010

(30) Foreign Application Priority Data

Jun. 30, 2009 (JP) ................................ 2009-154668

(51) Int. Cl.
*H02H 1/00* (2006.01)

(52) U.S. Cl. ...................................................... 361/127

(58) Field of Classification Search .................... 36/127, 36/128

See application file for complete search history.

(56) References Cited

U.S. PATENT DOCUMENTS

| | | | | | |
|---|---|---|---|---|---|
| 4,161,763 | A * | 7/1979 | Stetson | 361/128 |
| 5,444,429 | A * | 8/1995 | Sakich et al. | 338/21 |
| 5,959,822 | A * | 9/1999 | Bock et al. | 361/117 |
| 6,396,676 | B1 * | 5/2002 | Doone et al. | 361/117 |
| 2008/0151460 | A1 * | 6/2008 | Gohler et al. | 361/118 |
| 2009/0046408 | A1 * | 2/2009 | Klaube | 361/118 |
| 2009/0129030 | A1 * | 5/2009 | Krause | 361/728 |
| 2009/0225487 | A1 * | 9/2009 | Klaube | 361/118 |

FOREIGN PATENT DOCUMENTS

| | | | |
|---|---|---|---|
| CN | 1317807 | A | 10/2001 |
| CN | 101164123 | A | 4/2008 |
| JP | 2001-282560 | | 10/2001 |

OTHER PUBLICATIONS

Office Action issued Feb. 29, 2012, in Chinese Patent Application No. 201010214682.8, filed Jun. 24, 2010 (with English translation).

* cited by examiner

*Primary Examiner* — Ronald W Leja

(74) *Attorney, Agent, or Firm* — Oblon, Spivak, McClelland, Maier & Neustadt, L.L.P.

(57) ABSTRACT

A polymer surge arrester has: internal elements including a plurality of disc-shaped nonlinear resistors disposed in a stacked manner, electrodes disposed at both ends of the nonlinear resistors, and a plurality of insulating rods coupling the electrodes; an insulating outer skin formed outside the internal elements by casting an insulating resin; and disc-shaped porous metal plates interposed between at least parts of the nonlinear resistors.

8 Claims, 3 Drawing Sheets

POLYMER SURGE ARRESTER

CROSS REFERENCE TO RELATED APPLICATIONS

This application is based upon and claims the benefit of priority from the prior Japanese Patent Application No. 2009-154668, filed on Jun. 30, 2009; the entire contents of which are incorporated herein by reference.

FIELD

Embodiments described herein relate generally to a polymer surge arrester.

BACKGROUND

In a power system such as a power transmission line, a power plant, or a substation, conventionally a surge arrester is provided to remove excess voltage and protect the power system and electrical equipment. Among such surge arresters, a polymer surge arrester has a structure such that a plurality of disc-shaped nonlinear resistors mainly containing zinc oxide are stacked, and an electrode is disposed at each of upper and lower end portions thereof, for example. Further, for increasing rigidity, a plurality of insulating rods for fastening the nonlinear resisters are disposed around the nonlinear resistors, and these insulating rods are fixed with a plurality of metal plates or insulating plates to prevent positional displacement of them.

The above-described components are generally called internal elements. Outside these internal elements, an insulating outer skin is formed by casting an insulating resin. In this casting process of the insulating resin, the insulating resin is injected at a high pressure (about 6 MPa to 10 MPa for example) to expel residual air in the insulating resin and air sucked therein during the casting to the outside of the insulating outer skin, thereby preventing occurrence of defect in appearance.

As described above, when the polymer surge arrester is produced, the insulating resin is injected at a high-pressure (about 6 MPa to 10 MPa for example) in the casting process of the insulating resin. Further, the viscosity of the insulating resin at this time is not so high. The viscosity is about 50 Pascal-seconds (Pa·s) for example. Accordingly, the insulating resin may enter among internal elements. In this case, there may occur a contact failure between conductive faces, decrease in energy absorption capability due to reduction in conductive areas of the nonlinear resistors, and the like.

DETAILED DESCRIPTION

It is an object of embodiments described below to provide a polymer surge arrester capable of inhibiting occurrence of contact failure due to interfering with electrical conduction, decrease in energy absorption capability due to reduction in conductive areas, and the like by an insulating resin which entered among internal elements.

One aspect of the polymer surge arrester has: internal elements including a plurality of disc-shaped nonlinear resistors disposed in a stacked manner, electrodes disposed at both ends of the nonlinear resistors, and a plurality of insulating rods coupling the electrodes; an insulating outer skin formed outside the internal elements by casting an insulating resin; and disc-shaped porous metal plates interposed between at least parts of the nonlinear resistors.

Hereinafter, embodiments will be described with reference to the drawings.

Figure 1:
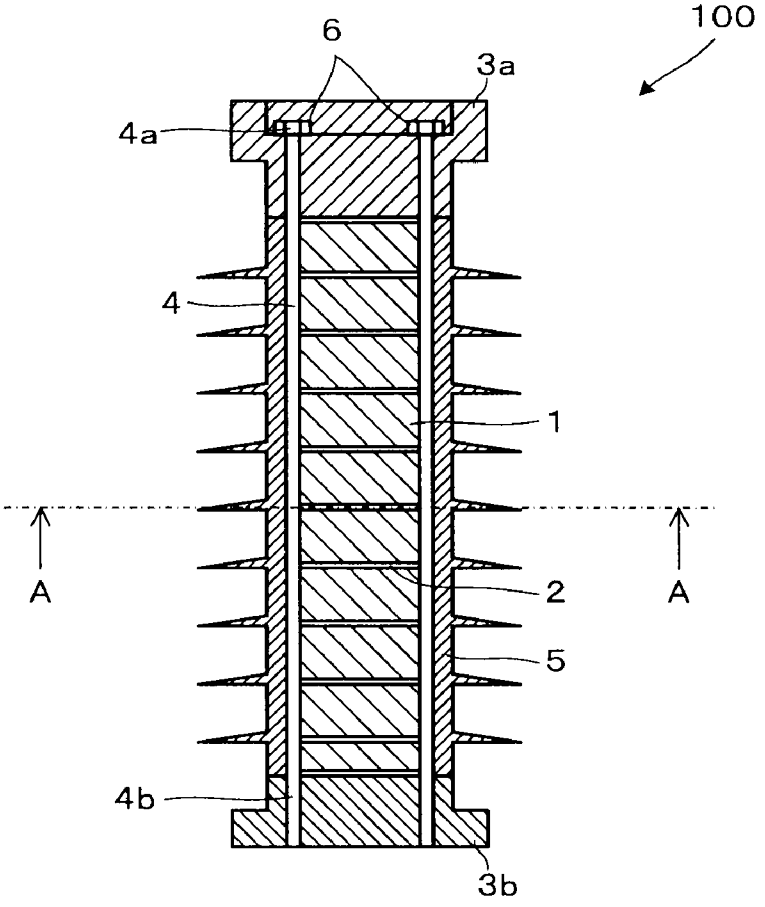
FIG. 1 is a vertical cross-sectional view illustrating a structure of a first embodiment.
Figure 2:
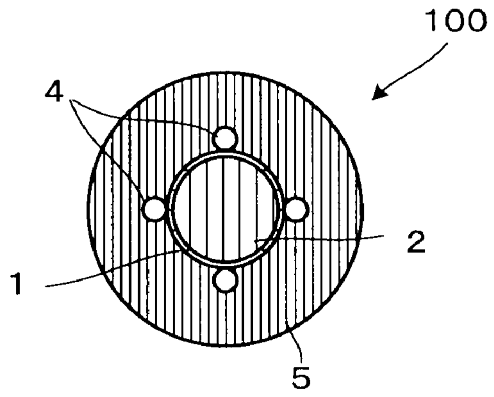
FIG. 2 is a horizontal cross-sectional view illustrating a cross-sectional structure of the first embodiment taken along a line A-A in FIG. 1.

FIG. 1 is a view illustrating a vertical cross-sectional schematic structure of a polymer surge arrester 100 according to a first embodiment. FIG. 2 is a view illustrating a horizontal cross-sectional schematic structure taken along a line A-A in FIG. 1. As illustrated in these views, the polymer surge arrester 100 has a plurality of disc-shaped nonlinear resistors 1, which are formed of a material mainly containing zinc oxide, and are disposed in a stacked manner, for example. In this embodiment, porous metal plates 2 formed in a disc shape from a porous metal having numerous continuous air bubbles are disposed between all the nonlinear resistors 1.

As the porous metal material for forming the porous metal plates 2, for example, a metallic porous body of Ni, Ni—Cr, or the like can be used. For example, Celmet (product name (made by Sumitomo Electric Toyama Co., Ltd.)) or the like can be used, which is a porous metal body having a three-dimensional mesh skeleton like a sponge. The porous metal plates 2 preferably have a thickness of about 0.1 mm to 1 mm, which is 0.3 mm in this embodiment. Further, when a porous metal such as Celmet is used, it is also possible to use one having a thickness that is thinned in some measure by rolling.

Porous metal plates 2 are disposed at both end portions in a stacking direction of a stacked body of the nonlinear resistors 1 and the porous metal plates 2, and metal electrodes 3*a*, 3*b* are disposed abutting on these porous metal plates 2. A plurality (four in this embodiment) of insulating rods 4 coupling these metal electrodes 3*a*, 3*b* are disposed to surround the periphery of the stacked body of the nonlinear resistors 1 and the porous metal plates 2. The insulating rods 4 can be formed of FRP (Fiber Reinforced Plastics) or the like for example.

The insulating rods 4 each have screw portions 4*a*, 4*b* at both end portions in a longitudinal direction thereof. One screw portion 4*b* (the screw portion on a lower side in FIG. 1) is fixed by screwing into a screw hole provided in the metal electrode 3*b*. The other screw portion 4*a* (the screw portion on an upper side in FIG. 1) penetrates through a through hole provided in the metal electrode 3*a*, and a nut 6 is screwed on this screw portion. Thus, the insulating rods 4 are fixed so as to couple the metal electrode 3*a* and the metal electrode 3*b*. An insulating resin (silicone resin in this embodiment) is casted outside the thus formed internal elements so as to form an insulating outer skin 5, thereby integrating the internal elements and the insulating outer skin 5.

In the polymer surge arrester structured by stacking the nonlinear resistors 1 and the metal electrodes 3*a*, 3*b*, it is possible that the insulating resin (silicone resin) enters conductive faces (abutting faces) of the nonlinear resistors 1 and the metal electrodes 3*a*, 3*b* while casting the insulating outer skin 5, thereby causing a contact failure and the like.

In this point, in the polymer surge arrester 100 of this embodiment, even when the silicone resin enters the conductive faces (abutting faces) of the nonlinear resistors 1 and the metal electrodes 3*a*, 3*b*, the silicone resin can be kept in the air bubbles inside the porous metal plates 2, thereby securing an electrical conduction path via the porous metal plates 2. Accordingly, it is possible to inhibit the silicone resin which entered the conductive faces (abutting faces) from interfering with electrical conduction to cause a contact failure. Further, by keeping the silicone resin in the air bubbles inside the porous metal plates 2, contact areas of the nonlinear resistors 1 and the porous metal plates 2 before and after the casting is made equal, which also allows to inhibit occurrence of decrease in energy absorption capability due to reduction in conductive areas. Moreover, in the casting process of the silicone resin, an injection pressure sufficient for expelling air bubbles in the resin such as a high pressure (about 6 MPa to 10 MPa for example) is employed, which makes it possible to inhibit occurrence of defect in appearance.

In the polymer surge arrester 100, the porous metal plates 2 are interposed between all the nonlinear resistors 1 and between the nonlinear resistors 1 and the metal electrodes 3*a*, 3*b*. However, the porous metal plates 2 may be disposed only between, for example, parts of the nonlinear resistors 1 which the silicone resin can particularly easily enter.

Figure 3:
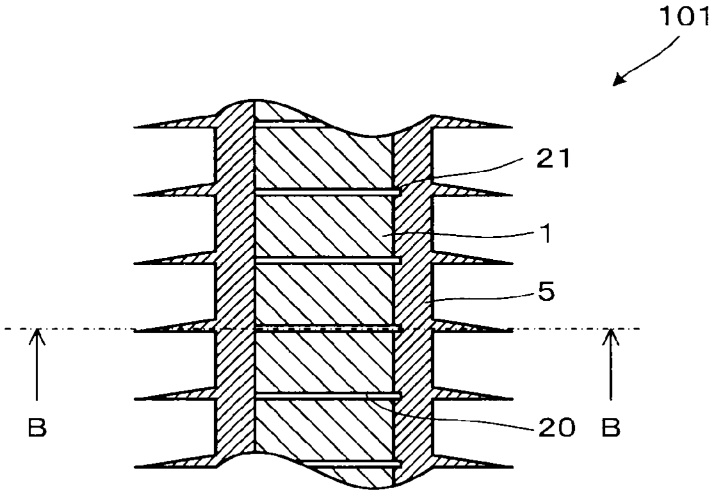
FIG. 3 is a vertical cross-sectional view illustrating the structure of a main part of a second embodiment.
Figure 4:
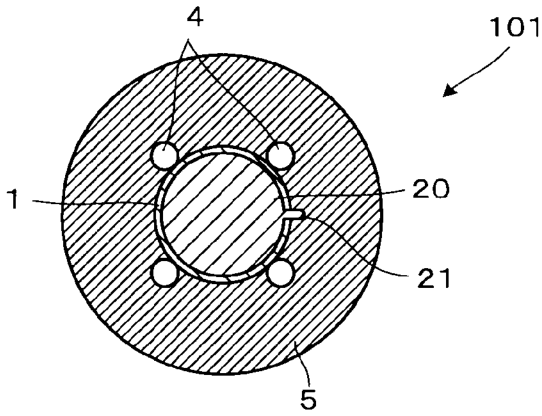
FIG. 4 is a horizontal cross-sectional view illustrating a cross-sectional structure of the second embodiment taken along a line B-B in FIG. 3.

Next, a second embodiment will be described with reference to FIG. 3 and FIG. 4. FIG. 3 is a view illustrating a schematic vertical cross-sectional structure of a main part of a polymer surge arrester 101 according to the second embodiment. FIG. 4 is a view illustrating a schematic horizontal cross-sectional structure taken along a line B-B in FIG. 3.

As illustrated in FIG. 3 and FIG. 4, in the polymer surge arrester 101 of the second embodiment, porous metal plates 20 each have a projection 21 projecting in a circumferential direction. Projections 21 of the porous metal plates 20 are located on a straight line along the stacking direction of the nonlinear resistors 1 among the insulating rods 4. The polymer surge arrester 101 of the second embodiment is structured similarly to the polymer surge arrester 100 of the above-described first embodiment except this point. Thus, the corresponding parts are designated by the same reference numerals, and duplicating descriptions are omitted.

In the polymer surge arrester 101 of the second embodiment having the above-described structure, operations and effects similar to those of the above-described first embodiment can be obtained. Further, when an excessive duty occurs while the polymer surge arrester 101 is in operation, it is possible to allow occurrence of electrical discharge in the portion of the projections 21 of the porous metal plates 20 before the nonlinear resistors 1 are critically damaged. As a result, the insulating outer skin 5 between the insulating rods 4 are broken, and the discharge changes to external discharge. Accordingly, the possibility that an arc occurs between the nonlinear resistors 1 and the insulating rods 4 is lowered, and the possibility that explosive scattering of the polymer surge arrester 101 occurs can be reduced.

Figure 5:
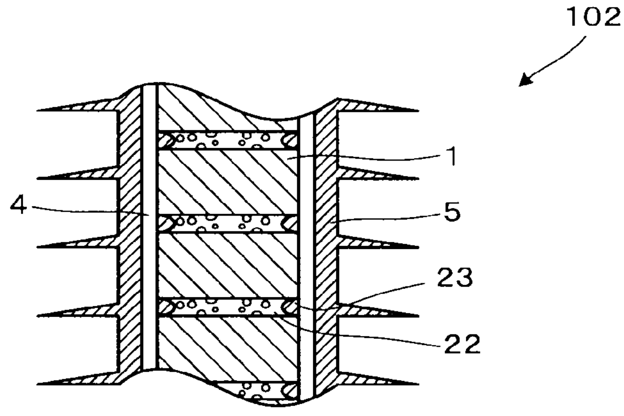
FIG. 5 is a vertical cross-sectional view illustrating the structure of a main part of a third embodiment.
Figure 6:
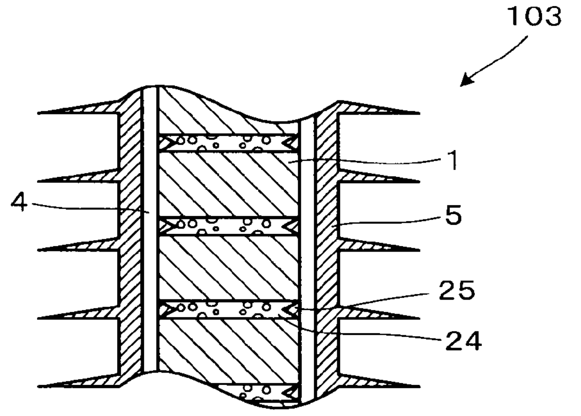
FIG. 6 is a vertical cross-sectional view illustrating the structure of a main part of a fourth embodiment.

Next, a third embodiment and a forth embodiment will be described with reference to FIG. 5 and FIG. 6. As illustrated in FIG. 5, in a polymer surge arrester 102 of the third embodiment, U-shaped trenches 23 are formed in outer peripheral portions (side wall portions) of porous metal plates 22. As illustrated in FIG. 6, in a polymer surge arrester 103 of the fourth embodiment, V-shaped trenches 25 are formed in outer peripheral portions (side wall portions) of porous metal plates 24. Note that the polymer surge arrester 102 of the third embodiment and the polymer surge arrester 103 of the fourth embodiment are structured similarly to the polymer surge arrester 100 of the first embodiment except these points. Thus, the corresponding parts are designated by the same reference numerals, and duplicating descriptions are omitted.

In the polymer surge arrester 102 of the third embodiment and the polymer surge arrester 103 of the fourth embodiment structured as above, it is possible to obtain operations and effects similar to those of the above-described first embodiment. Moreover, using the porous metal plates 22, 24 in which trenches with an inclination in a depressed direction such as the U-shaped trenches 23 and the V-shaped trenches 25 are formed, the silicone resin (insulating resin) is guided along the inclined side walls of the U-shaped trenches 23 and the V-shaped trenches 25 when casting the silicone resin, thereby forming flows of the silicone resin heading to center portions in a thickness direction of the porous metal plates 22, 24. By such flows of the silicone resin, it is possible to inhibit the silicone resin from flowing into the contact faces of the porous metal plates 22, 24 with the nonlinear resistors 1 and the metal electrodes 3*a*, 3*b*, and the possibility of occurrence of contact failure and decrease in energy absorption capability can be further reduced.

Figure 7:
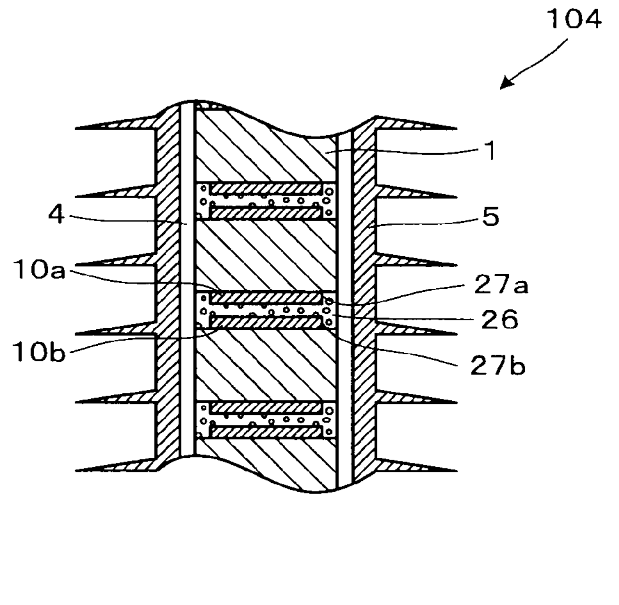
FIG. 7 is a vertical cross-sectional view illustrating the structure of a main part of a fifth embodiment.

Next, a fifth embodiment will be described with reference to FIG. 7. As illustrated in FIG. 7, in a polymer surge arrester 104 of the fifth embodiment, porous metal plates 26 have circular trenches 27*a*, 27*b* in flat portions on both sides, which are contact faces with the nonlinear resistors 1 or the metal electrodes 3*a*, 3*b*. These circular trenches 27*a*, 27*b* are formed concentrically with the outer shape of the porous metal plates 26. Then conductive plates 10*a*, 10*b* made of metal or the like are disposed in these circular trenches 27*a*, 27*b*.

In the polymer surge arrester 104 of the fifth embodiment having the above-described structure, operations and effects similar to those of the above-described first embodiment can be obtained. Further, in this polymer surge arrester 104, the nonlinear resistors 1 and the metal electrodes 3*a*, 3*b* contact the porous metal plates 26 via circular areas surrounding the circular trenches 27*a*, 27*b* of the porous metal plates 26, and contact the conductive plates 10*a*, 10*b* via inside portions of these circular areas. Accordingly, the conductive areas can be increased, compared to those of the first embodiment, and the possibility of occurrence of decrease in energy absorption capability can be reduced further.

Next, with respect to the polymer surge arrester 100 of the above-described first embodiment, results of examining the relation between the state of holes (the number of cells (number per inch)) of the porous metal plates 2 and the energy absorption capability will be described. As the porous metal plates 2, there are prepared four types of porous metal plates 2, one with the number of cells being 56 per inch (surface area ratio=7.5 $mm^2/mm^3$), one with the number of cells being 67.2 per inch (ratio to surface area=9 $mm^2/mm^3$), one with the number of cells being 75 per inch (ratio to surface area=10 $mm^2/mm^3$), and one with the number of cells being 373 per inch (ratio to surface area=50 $mm^2/mm^3$), and pulse current of 65 kA was conducted twice through each of them. Then the state of the nonlinear resistor 1 was observed visually, so as to judge pass or fail of the energy absorption capability of each porous metal plate 2. Results thereof are shown in Table 1.

TABLE 1

| | | THE NUMBER OF CELLS (NUMBER PER INCH) | | | |
|---|---|---|---|---|---|
| | | 373 | 75 | 67.2 | 56 |
| STATE AFTER ELECTRICAL CONDUCTION | FIRST TIME | NO PROBLEM | NO PROBLEM | NO PROBLEM | BREAKAGE |
| | SECOND TIME | NO PROBLEM | NO PROBLEM | NO PROBLEM | — |

As shown in Table 1, there was no problem found in the above-described examination of energy absorption capability when three types of porous metal plates 2 were used, which are one with the number of cells being 67.2 per inch (ratio to surface area=9 $mm^2/mm^3$), one with the number of cells being 75 per inch (ratio to surface area=10 $mm^2/mm^3$), and one with the number of cells being 373 per inch (ratio to surface area=50 $mm^2/mm^3$).

On the other hand, when the porous metal plate 2 with the number of cells being 56 per inch (ratio to surface area=7.5 $mm^2/mm^3$) was used, breakage occurred in the nonlinear resistors 1 by one time of conduction of pulse current. Therefore, for a polymer surge arrester requiring resistance to the pulse current of 65 kA or higher, it is preferred that porous metal plates 2 with the number of cells larger than 56 per inch (ratio to surface area=7.5 $mm^2/mm^3$) be used, and it is more preferred that porous metal plates 2 with the number of cells equal to or larger than 67.2 per inch (ratio to surface area=9 $mm^2/mm^3$) be used.

As described above, according to the embodiments, it is possible to provide a polymer surge arrester capable of inhibiting occurrence of contact failure due to interfering with electrical conduction, decrease in energy absorption capability due to reduction in conductive areas, and the like by an insulating resin which entered among internal elements.

While certain embodiments have been described, these embodiments have been presented by way of example only, and are not intended to limit the scope of the inventions. Indeed, the novel apparatus described herein may be embodied in a variety of the forms; furthermore, various omissions, substitutions and changes in the form of the apparatus described herein may be made without departing from the spirit of the inventions. The accompanying claims and their equivalents are intended to cover such forms or modifications as would fall within the scope and spirit of the inventions.

What is claimed is:

1. A polymer surge arrester, comprising:

internal elements comprising a plurality of disc-shaped nonlinear resistors disposed in a stacked manner, electrodes disposed at both ends of the nonlinear resistors, and a plurality of insulating rods coupling the electrodes;

an insulating outer skin formed outside the internal elements by casting an insulating resin; and disc-shaped porous metal plates interposed between at least parts of the nonlinear resistors, the plates having a number density of the pores of larger than 56 per inch and a thickness of 0.1 mm to 1 mm.

2. The polymer surge arrester according to claim 1, wherein the porous metal plates each have a projection projecting in a circumferential direction; and wherein the projections are disposed to be located on a straight line along a stacking direction of the nonlinear resistors among the insulating rods.

3. The polymer surge arrester according to claim 1, wherein the porous metal plates each have a U-shaped or V-shaped trench in an outer peripheral portion.

4. The polymer surge arrester according to claim 1, wherein the porous metal plates each have a trench in a flat portion, and a conductive plate made of metal is disposed in the trench.

5. The polymer surge arrester according to claim 4, wherein the trench is circular.

6. The polymer surge arrester according to claim 1, wherein the porous metal plates absorb a silicon resin into the pores to prevent the silicon resin from staying on the nonlinear resistors, if the silicon resin is entered between the porous metal plates and the nonlinear resistors.

7. The polymer surge arrester according to claim 1, wherein the porous metal plates each have a U-shaped trench in an outer peripheral portion.

8. The polymer surge arrester according to claim 1, wherein the porous metal plates each have a V-shaped trench in an outer peripheral portion.

* * * * *